United States Patent
Liu et al.

(10) Patent No.: US 12,223,068 B2
(45) Date of Patent: Feb. 11, 2025

(54) SECURE COMPUTING CONTROL METHOD, DATA PACKET PROCESSING METHOD AND DEVICE AND SYSTEM THEREOF

(71) Applicant: ZTE CORPORATION, Shenzhen (CN)

(72) Inventors: Jie Liu, Shenzhen (CN); Haibo Wang, Shenzhen (CN); Guoqiang Wang, Shenzhen (CN); Yubin Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 289 days.

(21) Appl. No.: 17/758,086

(22) PCT Filed: Dec. 22, 2020

(86) PCT No.: PCT/CN2020/138355
§ 371 (c)(1),
(2) Date: Jun. 28, 2022

(87) PCT Pub. No.: WO2021/136014
PCT Pub. Date: Jul. 8, 2021

(65) Prior Publication Data
US 2023/0033312 A1 Feb. 2, 2023

(30) Foreign Application Priority Data
Dec. 31, 2019 (CN) .......................... 201911421497.3

(51) Int. Cl.
*G06F 21/60* (2013.01)
*G06F 21/71* (2013.01)
(Continued)

(52) U.S. Cl.
CPC ............ *G06F 21/606* (2013.01); *G06F 21/71* (2013.01)

(58) Field of Classification Search
CPC ........ G06F 21/606; G06F 21/71; G06F 21/72; H04L 49/90; H04L 63/20; H04L 63/205; H04L 9/40; H04L 49/9057
See application file for complete search history.

(56) References Cited

U.S. PATENT DOCUMENTS

| | | | |
|---|---|---|---|
| 7,017,042 B1 * | 3/2006 | Ziai | H04L 9/00 713/161 |
| 10,164,770 B1 * | 12/2018 | Lee | G06F 8/445 |

(Continued)

FOREIGN PATENT DOCUMENTS

| | | |
|---|---|---|
| CN | 103516684 A | 1/2014 |
| CN | 107491317 A | 12/2017 |

(Continued)

OTHER PUBLICATIONS

The State Intellectual Property Office of People's Republic of China. First Office Action for CN Application No. 2019114214973 and English translation, mailed Jul. 20, 2023, pp. 1-14.

(Continued)

*Primary Examiner* — Darren B Schwartz
(74) *Attorney, Agent, or Firm* — Vivacqua Crane, PLLC

(57) ABSTRACT

A secure computing control method, a data packet processing method and device, and a system thereof are disclosed. The secure computing method may include: receiving a first data packet message for secure computing from a processor, the first data packet message including data packet information and secure computing configuration information corresponding to the data packet information; acquiring corresponding first data packet data from a memory according to the data packet information of the first data packet message; selecting a corresponding security algorithm according to the secure computing configuration information corresponding to the first data packet message; performing secure computing on the first data packet data by the (Continued)

selected security algorithm to generate secure computed second data packet data and a second data packet message corresponding to the second data packet data; transmitting the second data packet data to the memory; and transmitting the second data packet message to the processor.

15 Claims, 9 Drawing Sheets

(51) Int. Cl.
*G06F 21/72* (2013.01)
*H04L 9/40* (2022.01)
*H04L 49/90* (2022.01)

(56) References Cited

U.S. PATENT DOCUMENTS

| | | | |
|---|---|---|---|
| 10,498,529 B1* | 12/2019 | Hashmi | H04L 9/0618 |
| 10,826,876 B1* | 11/2020 | Sinn | H04L 63/162 |
| 2004/0128553 A1* | 7/2004 | Buer | H04L 67/1001 |
| | | | 713/153 |
| 2005/0076228 A1* | 4/2005 | Davis | G06F 21/73 |
| | | | 713/188 |
| 2007/0289014 A1* | 12/2007 | Pyo | H04L 63/20 |
| | | | 726/22 |
| 2008/0028210 A1* | 1/2008 | Asano | H04L 63/0485 |
| | | | 713/161 |
| 2008/0077793 A1* | 3/2008 | Tan | G06F 21/56 |
| | | | 713/168 |
| 2008/0270785 A1* | 10/2008 | Loprieno | H04L 9/0838 |
| | | | 713/150 |
| 2009/0060197 A1 | 3/2009 | Taylor et al. | |
| 2009/0113212 A1* | 4/2009 | Koehler | G06F 21/72 |
| | | | 713/189 |
| 2010/0217971 A1 | 8/2010 | Radhakrishnan et al. | |
| 2011/0153985 A1* | 6/2011 | Saha | H04L 63/166 |
| | | | 712/42 |
| 2012/0011351 A1 | 1/2012 | Mundra et al. | |
| 2012/0278615 A1* | 11/2012 | Liu | H04L 69/12 |
| | | | 713/160 |
| 2014/0331330 A1* | 11/2014 | Abhijeet | H04L 9/0894 |
| | | | 726/26 |
| 2018/0103018 A1* | 4/2018 | Chauhan | H04L 63/0485 |
| 2019/0180041 A1 | 6/2019 | Bhunia et al. | |
| 2021/0168138 A1* | 6/2021 | Paruchuri | H04L 63/0485 |

FOREIGN PATENT DOCUMENTS

| | | |
|---|---|---|
| CN | 107528690 A | 12/2017 |
| CN | 108616878 A | 10/2018 |
| CN | 110086752 A | 8/2019 |
| KR | 20070061329 A | 6/2007 |

OTHER PUBLICATIONS

The State Intellectual Property Office of People's Republic of China. First Search Report for CN Application No. 2019114214973 and English translation, mailed Jul. 14, 2023, pp. 1-4.

International Searching Authority. International Search Report and Written Opinion for PCT Application No. PCT/CN2020/138355 and English translation, mailed Mar. 24, 2021, pp. 1-10.

European Patent Office. Extended European Search Report for EP Application No. 20910529.5, mailed May 10, 2023, pp. 1-9.

Wang, H., et al. "A Gbps IPSec SSL Security Processor Design and Implementation in an FPGA Prototyping Platform," Journal of Signal Processing Systems for Signal, Image, and Video Technology, May 2009, vol. 58, No. 3, pp. 311-324.

* cited by examiner

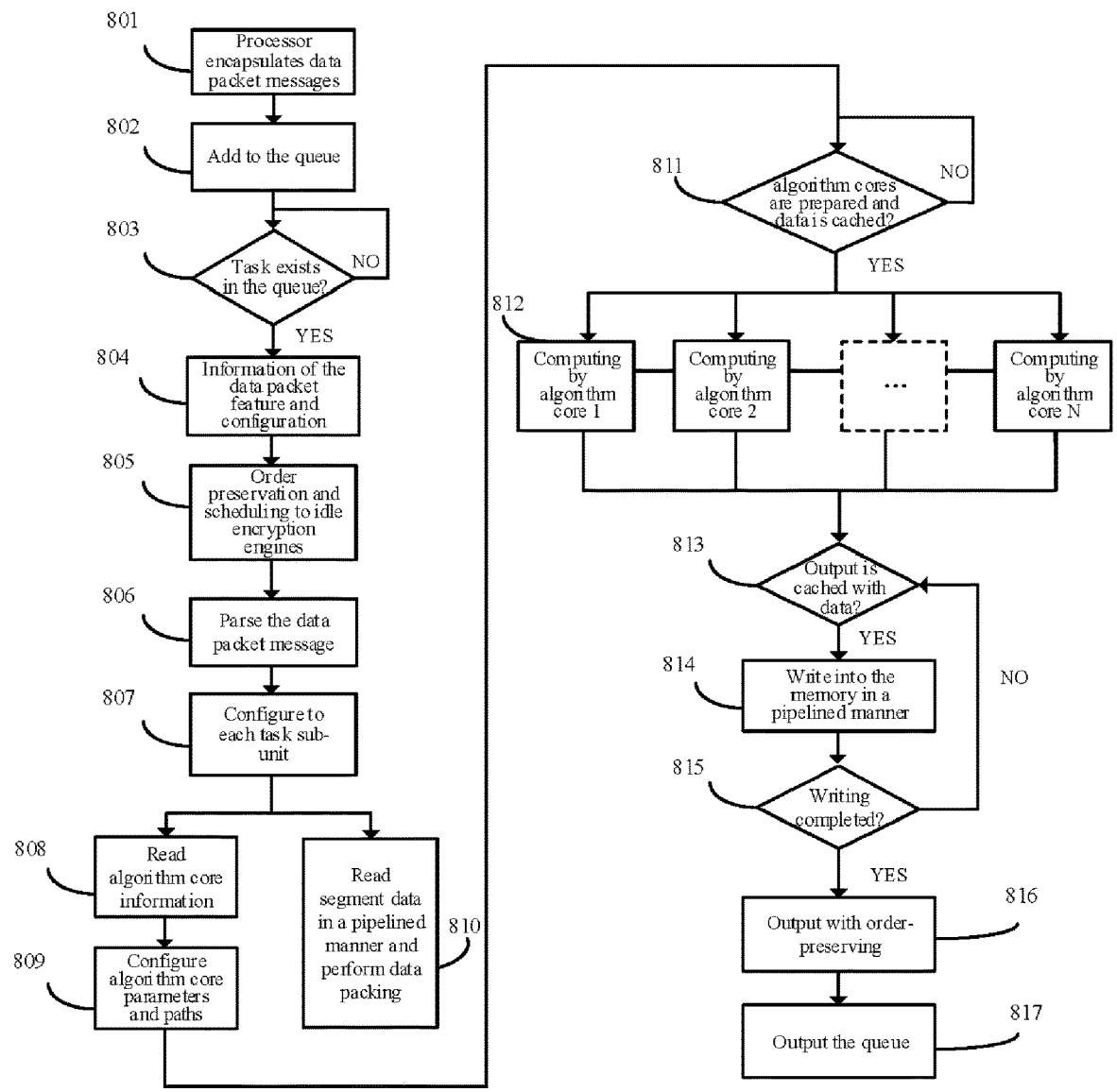

801: Processor encapsulates data packet messages

802: Add to the queue

803: Task exists in the queue?

804: Information of the data packet feature and configuration

805: Order preservation and scheduling to idle encryption engines

806: Parse the data packet messages

807: Configure to each task sub-unit

808: Read algorithm core information

809: Configure algorithm core parameters and paths

810: Read segment data in a pipelined manner and perform data packing

811: Algorithm cores are prepared and data is cached?

812: Computing by algorithm core 1; Computing by algorithm core 2; Computing by algorithm core N 813: Output is cached with data?

814: Write into memory in a pipelined manner

815: Writing completed?

816: Output with order-preserving

817: Output the queue

FIG. 9

SECURE COMPUTING CONTROL METHOD, DATA PACKET PROCESSING METHOD AND DEVICE AND SYSTEM THEREOF

CROSS-REFERENCE TO RELATED APPLICATION

This application is a national stage filing under 35 U.S.C. § 371 of international application number PCT/CN2020/138355, filed Dec. 22, 2020, which claims priority to Chinese patent application No. 201911421497.3, filed Dec. 31, 2019. The contents of these applications are incorporated herein by reference in their entirety.

TECHNICAL FIELD

The present disclosure relates to the field of information security, and in particular to a secure computing control method, a data packet processing method, a secure computing control apparatus and a data packet processing system.

BACKGROUND

In the field of communication or information security, with the great development of network and communication, the speed of information exchange and propagation becomes faster, so that the information security (i.e., the ability to ensure the confidentiality, integrity, repudiation resistance, authentication of data transmission, or the like) is increasingly important. On this basis, a large number of security algorithms and security protocols have emerged, and security-related algorithms and protocols can be found in almost every network transmission protocol stack.

However, another problem brought by security is efficiency. Since the security algorithms all involve data processing and a certain security standard would be achieved only if various complex operations are done, more system resources will be consumed, and the processing capability of the whole communication system is thus affected. Therefore, how to efficiently perform secure computing is particularly important.

Conventionally, improving the efficiency of the algorithm may be a method for efficiency improvement methods, that is, the processing capability of a single algorithm is enhanced by pipeline processing, parallel computing, big data bit width processing, etc. In addition, the overhead of switching between data packets is reduced by key reservation, context sharing, etc., so that the algorithm efficiency of the whole data stream is improved. However, limited discussion is involved as to how to efficiently utilize algorithm cores to improve the processing efficiency of data packets and algorithm cores and improve the efficiency of security algorithms for multi-stage processing.

SUMMARY

The summary of the subject matter detailed herein will be given below. The summary is not intended to limit the protection scope of the claims.

In accordance with an aspect of the present disclosure, an embodiment provides a secure computing control method and a data packet processing method, which can improve the processing efficiency of data packets and reduce the processing time of data packets.

In accordance with another aspect of the present disclosure, an embodiment provides a secure computing control method, which may include: receiving a first data packet message for secure computing from a processor, the first data packet message including data packet information and secure computing configuration information corresponding to the data packet information; acquiring corresponding first data packet data from a memory according to the data packet information of the first data packet message; selecting a corresponding security algorithm according to the secure computing configuration information corresponding to the first data packet message; performing secure computing on the first data packet data by means of the selected security algorithm to generate secure computed second data packet data and a second data packet message corresponding to the second data packet data; transmitting the second data packet data to the memory; and, transmitting the second data packet message to the processor.

In accordance with another aspect of the present disclosure, an embodiment further provides a data packet processing method applied to a data packet processing system. The system may include: a processor, a secure computing control apparatus and a memory. The secure computing control apparatus is connected to the processor and the memory, respectively. The method may include: transmitting, by the processor, a first data packet message for secure computing to the secure computing control apparatus, the first data packet message including data packet information and secure computing configuration information corresponding to the data packet information; acquiring, by the secure computing control apparatus, corresponding first data packet data from the memory according to the data packet information of the first data packet message; selecting, by the secure computing control apparatus, a corresponding security algorithm according to the secure computing configuration information corresponding to the first data packet message; performing, by the secure computing control apparatus, secure computing on the first data packet data by means of the security algorithm to generate secure computed second data packet data and a second data packet message corresponding to the second data packet data, and outputting the second data packet data to the memory; and, transmitting, by the secure computing control apparatus, the second data packet message to the processor.

In accordance with yet another aspect of the present disclosure, an embodiment provides a secure computing control apparatus. The apparatus may include: a management module, which is configured to: receive a first data packet message for secure computing from a processor, the first data packet message including data packet information and secure computing configuration information corresponding to the data packet information; and transmit a second data packet message to the processor; and, a control module, which is connected to the management module and is configured to: acquire corresponding first data packet data from a memory according to the data packet information of the first data packet message; select a corresponding security algorithm according to the secure computing configuration information corresponding to the first data packet message; perform secure computing on the first data packet data by means of the security algorithm to generate secure computed second data packet data and a second data packet message corresponding to the second data packet data; and transmit the second data packet data to the memory.

In accordance with yet another aspect of the present disclosure, an embodiment further provides a secure computing control apparatus, which may include: a storage device, a processing unit and at least one computer program stored on the storage device and executable by the processing unit which, when executed by the processing unit, causes the processing unit to implement the secure computing control method as described above.

In accordance with yet another aspect of the present disclosure, an embodiment further provides a data packet processing system, which may include: a memory; a processor connected to the memory; and, the secure computing control apparatus as described above, which is connected to the processor and the memory, respectively.

In accordance with yet another aspect of the present disclosure, an embodiment further provides a data packet processing system, which may include: a memory, a processor, a secure computing control apparatus which is connected to the memory and the processor respectively, and at least one computer program stored on the memory and executable by the processor which, when executed by the processor, causes the processor to implement the data packet processing method as described above.

In accordance with yet another aspect of the present disclosure, an embodiment further provides a non-transitory computer-readable storage medium storing at least one computer program which, when executed by a processor, causes the processor to implement the secure computing control method as described above or the data packet processing method as described above.

Other features and advantages of the present disclosure will be illustrated in the following description, and will partially become apparent from the description or be appreciated by implementing the present disclosure. The objectives and other advantages of the present disclosure may be achieved and obtained by the constructions specified in the description, the claims and the accompanying drawings.

BRIEF DESCRIPTION OF DRAWINGS

The accompanying drawings are provided to illustrate the technical schemes of the present disclosure and constitute a part of this description. The accompanying drawings are intended to illustrate the technical schemes of the present disclosure in conjunction with various embodiments of the present disclosure, and are not intended to limit the present disclosure.

FIG. 9 depicts a flowchart of a data packet processing method according to an embodiment of the present disclosure.

DETAILED DESCRIPTION

To make the objectives, technical schemes and advantages of the present disclosure clearer, the present disclosure will be further described below in detail by embodiments with reference to the accompanying drawings. It should be understood that the embodiments described herein are merely for illustrating the present disclosure, and are not intended to limit the present disclosure.

It should be understood that, in the description of the embodiments of the present disclosure, a plurality of (or multiple) means more than two; greater than, less than, more than, etc., are interpreted as excluding this number; and, above, below, within, etc., are interpreted as including this number. If described, the terms such as "first" and "second" are only for distinguishing the technical features, rather than indicating or implying relative importance or implicitly indicating the number of the involved technical features or the precedence relationship between the involved technical features.

In the field of communication or information security, a large number of secure computations based on security algorithms are needed. Since the security algorithms all involve the processing of data, particularly data packets, and can reach a certain security standard only after undergoing various complex operations, more system resources will be consumed and the processing capability of the whole communication system is thus affected. Therefore, how to efficiently perform secure computing is particularly important. In addition, it is also necessary to consider how to efficiently utilize algorithm cores to improve the processing efficiency of data packets and algorithm cores and improve the efficiency of security algorithms for multi-stage processing.

The implementations of the present disclosure will be described below in detail with reference to the accompanying drawings.

Figure 1:
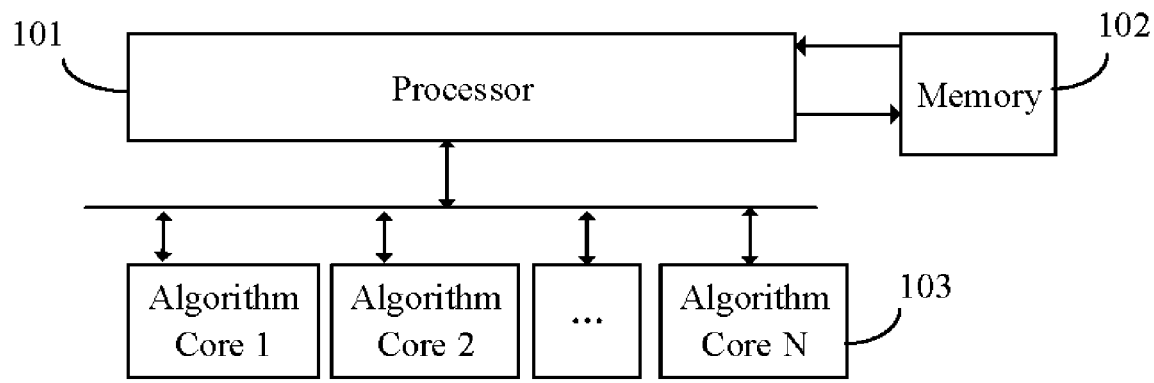
FIG. 1 depicts a schematic diagram showing an architecture of a conventional secure computing system.

In a conventional secure computing system, as shown in FIG. 1, all operations related to secure computing are completed by a processor 101. For example, a central processing unit (CPU) accesses data for secure computing from a memory 102 and calls 1 to N secure algorithms (also referred to as algorithm cores 103), to complete the secure computing in the CPU. In this computing environment, even if the efficiency of a single algorithm core 103 can be improved, due to the overwhelming workload of the CPU, the performance and efficiency of the whole secure computing system are still limited by the CPU.

The method, apparatus and system related to secure computing control and processing in the present disclosure are improved and optimized based on the conventional secure computing system, where some functions for data packet processing are released from the processor 101 (that is, the software is executed by the processor 101, which is equivalent to a software environment) to the hardware for completion, thus realizing the cooperation of software and hardware. Thus, the purpose of reducing the delay of data packet processing in the whole computing environment is achieved. In the data packet processing system combining software and hardware shown in FIG. 2, the secure computing apparatus 104 is a main unit for improving the data packet processing efficiency and performance.

Figure 2:
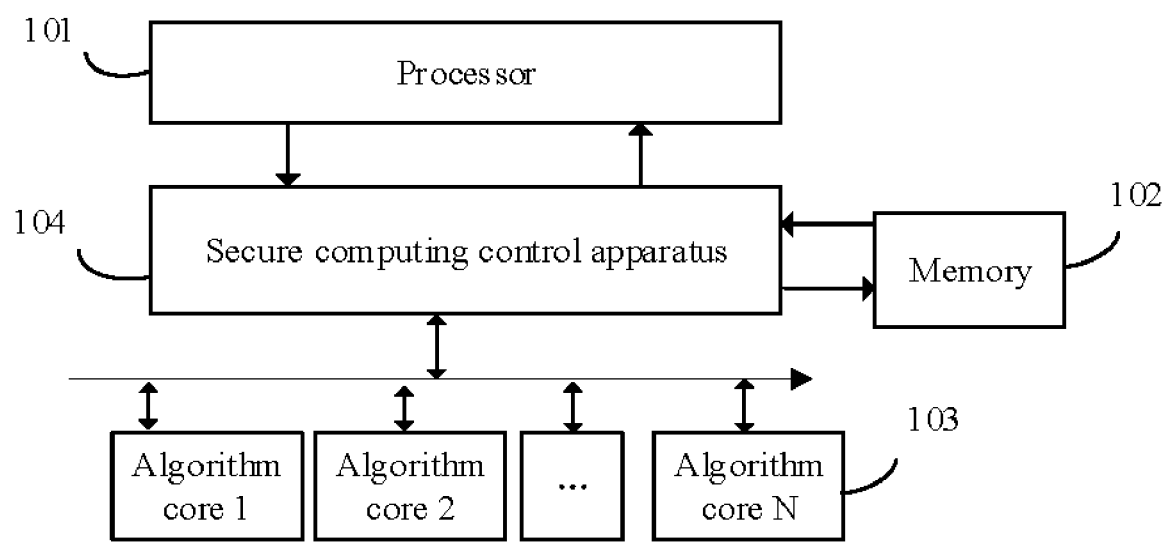
FIG. 2 depicts a schematic diagram of a system environment for secure computing control and data packet processing according to an embodiment of the present disclosure.

With reference to FIG. 2, the whole data packet processing system may include four parts, i.e., the processor 101, the secure computing control apparatus 104, 1 to N algorithm cores 103 and the memory 102.

The processor 101 encapsulates and transmits a data packet message that includes data packet information on which secure computing is to be performed and secure computing configuration information corresponding to the data packet information.

The secure computing control apparatus 104, referred to as a control apparatus or controller for short hereinafter, may be interpreted by those having ordinary skill in the art as a control apparatus for controlling secure computing, particularly for controlling secure computing to the data packets. The secure computing control apparatus 104 writes and reads data packet data to and from the memory 102 according to the data packet message through the procedure and units described below, and accelerates the processing of the data packets.

The 1 to N algorithm cores 103, also referred to as security algorithms herein, perform specific secure computing.

The memory 102 mainly stores the data of the algorithm cores 103 and the data packet.

The operation process and specific structure of the secure computing control apparatus 104 will be described below in more detail based on the environment shown in FIG. 2.

Figure 3:
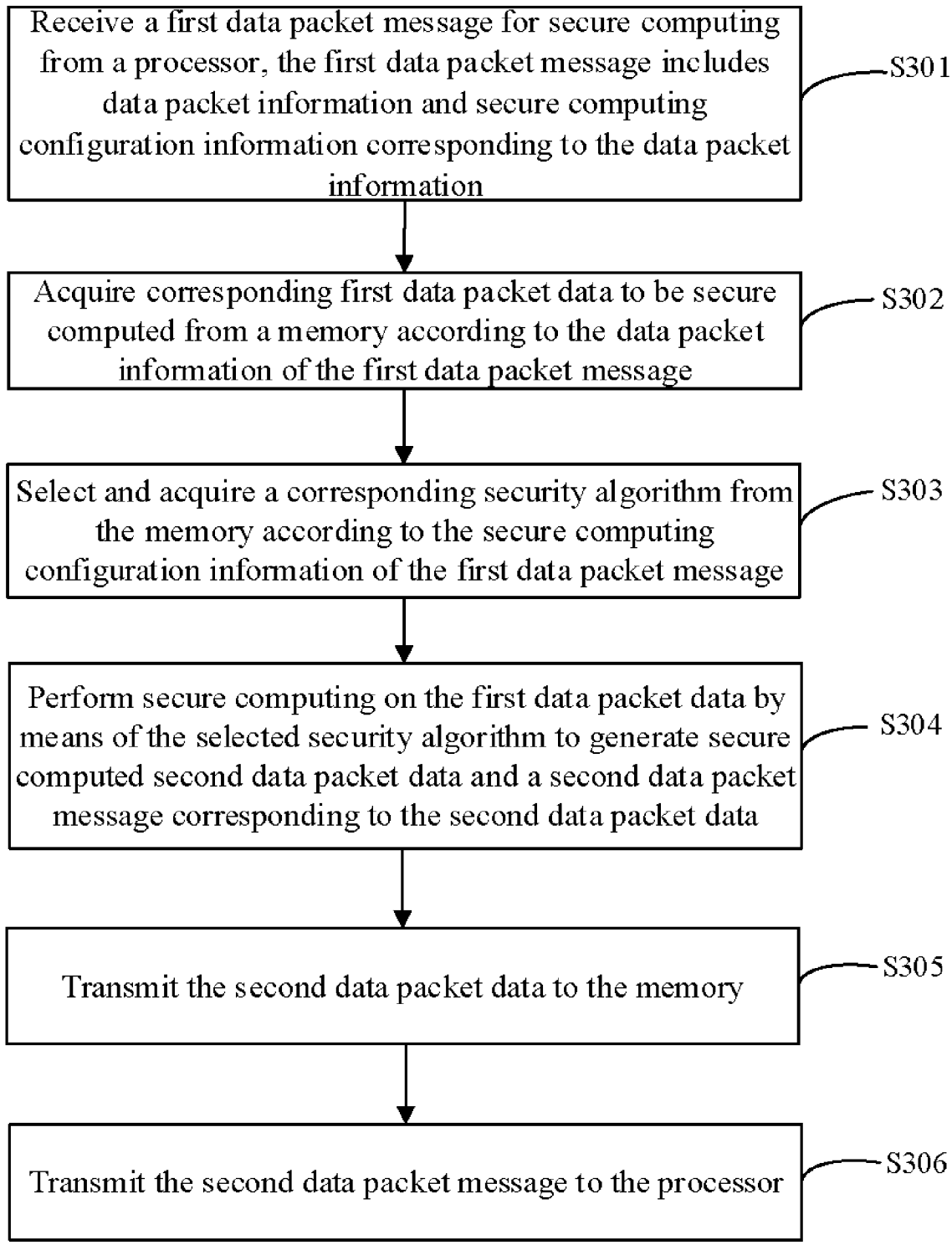
FIG. 3 depicts an overall flowchart of a secure computing control method according to an embodiment of the present disclosure.

FIG. 3 is an overall flowchart of a secure computing control method according to an embodiment of the present disclosure. As shown in FIG. 3, the method may be performed by the secure computing control apparatus 104 described above to realize hardware acceleration of data packets. The method includes, but is not limited to, the following S301 to S306.

At S301, a first data packet message for secure computing is received from a processor 101, where the first data packet message includes data packet information and secure computing configuration information corresponding to the data packet information.

At 302, corresponding first data packet data is acquired from a memory 102 according to the data packet information of the first data packet message.

At S303, a corresponding security algorithm is selected according to the secure computing configuration information corresponding to the first data packet message.

At S304, secure computing is performed on the first data packet data by means of the selected security algorithm to generate secure computed second data packet data and a second data packet message corresponding to the second data packet data.

At S305, the second data packet data is transmitted to the memory 102.

At S306, the second data packet message is transmitted to the processor 101.

Based on the advantages of the high-speed parallel computation of the hardware, one or more of the above processes may be performed in parallel.

In an example, the processor 101 may be a central processing unit of a general-purpose computer, or an embedded processor or microprocessor used for a particular task, etc. The memory 102 may be an external memory, or a storage portion integrated inside the hardware.

In some implementations, the method described in this embodiment may be a control flow or control logic specific for the hardware. However, it should be understood that the method may also be a control flow specific for the software.

In some implementations, the interaction efficiency between the software and the hardware is further improved by queuing. In particular, the receiving of a first data packet message for secure computing from a processor 101 at S301 may include: receiving one or more first data packet messages for secure computing from the processer 101, where the one or more first data packet messages form a message input queue 5011. The performing of secure computing on the first data packet data by means of the selected security algorithm at S304 may include: performing secure computing on the first data packet data based on the message input queue 5011 according to the security algorithm corresponding to each piece of first data packet data.

The transmitting of the second data packet message to the processor 101 at S306 includes: acquiring second data packet messages corresponding to the one or more first data packet messages, forming the second data packet messages into a message output queue 5012, and transmitting the message output queue 5012 to the processor 101. The second data packet message may include information of completed data packet tasks, for example, information about the data packet on which secure computing has been performed and the secure computing processing information corresponding to the information about the data packet.

In some implementations, the resources of the hardware may be efficiently allocated in the following way. One or more idle secure computing spatial resources are allocated for secure computing in accordance with the order of first data packet messages in the input queue 5011, and secure computing is performed on the first data packet data according to the security algorithm corresponding to each piece of first data packet data. A plurality of secure computing spatial resources (e.g., encryption engines 5031 described below) may be constructed in the hardware, and all hardware resources are fully utilized to accelerate the secure computing of data packets through reasonable allocation. Since the data packet messages are managed in queues and flexibly allocated according to the resource condition, an output queue 5012 that is processed keeps corresponding to the input queue 5011 in terms of the order, so that proper order-preserving processing may be performed. For example, an order-preserving tag is added for each data packet message, so as to realize order-preserving output once secure computing is completed.

In some implementations, efficient and centralized packing can be realized in the hardware environment by splicing. The data packet information of the first data packet message includes segment information of the data packet. The first data packet data includes segment data corresponding to the segment information. The S302 may accordingly include: acquiring segment data of the corresponding data packet from the memory 102 according to the segment information of the data packet, and splicing the segment data to generate data packet cache data. The spliced data may be immediately further processed, and the remaining segment data in the memory 102 is continuously retrieved and saved, so that a pipelined operation is realized and the processing time of data packets is effectively reduced.

In the hardware environment, the security algorithm and the data packet data may be read in parallel, thereby further reducing the processing time of data packets. In some implementations, the step S303 may accordingly include: selecting one or more corresponding security algorithms from the memory 102 according to the secure computing configuration information corresponding to the first data packet message, and allocating the one or more security algorithms to the secure computing spatial resources.

In some implementations, the number of times of reading the memory 102 is decreased by caching by stages and multi-stage parallel and pipelined processing, so that efficient secure computing of data packets is realized. The secure computing configuration information of the first data packet message includes information of security algorithms to be selected, information of the order of processing by security algorithms, and security algorithm configuration information. The step S303 accordingly may include: selecting and acquiring one or more corresponding security algorithms from the memory 102 according to the secure computing configuration information corresponding to the first data packet message. The performing of secure computing on the first data packet data through the selected security algorithm at S304 may include: performing single-stage or multi-stage secure computing on the data packet cache data through the one or more selected security algorithms according to the secure computing configuration information and in the order of processing by security algorithms. As an example, single-stage secure computing is performed on the data packet cache data through one selected security algorithm, or multi-stage secure computing is performed on the data packet cache data through a plurality of selected security algorithms. The multi-stage secure computing means that multiple stages of secure computing are performed on the first data packet data through a plurality of security algorithms. For example, in a first stage of secure computing, encryption is performed by utilizing an encryption algorithm; and, in a second stage of secure computing, authentication is performed by calling an authentication algorithm. The multi-stage secure computing may also be classified into stage-by-stage secure computing and non-stage-by-stage secure computing. For example, after the first stage of secure computing is completed, it is possible to directly skip to the processing in a third stage according to actual needs without performing the authentication in the second stage. The single-stage secure computing means that a single stage of secure computing is performed on the first data packet data by utilizing only one security algorithm. For example, only encryption is to be performed on some data packets by calling an encryption algorithm.

Figure 10:
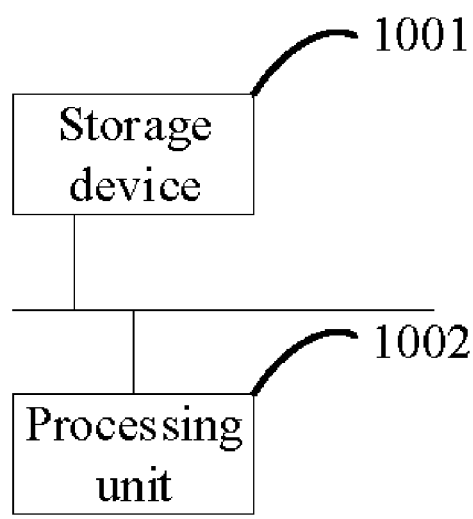
FIG. 10 depicts a schematic diagram of a secure computing control apparatus according to an embodiment of the present disclosure.

In accordance with an embodiment of the present disclosure, a secure computing control apparatus is further provided. As shown in FIG. 10, the apparatus includes: a storage device 1001, a processing unit 1002 and computer programs stored on the storage device 1001 and executable by the processing unit 1002 which, when executed by the processing unit 1002, cause the processing unit 1002 to implement the secure computing control method described above.

Figure 4:
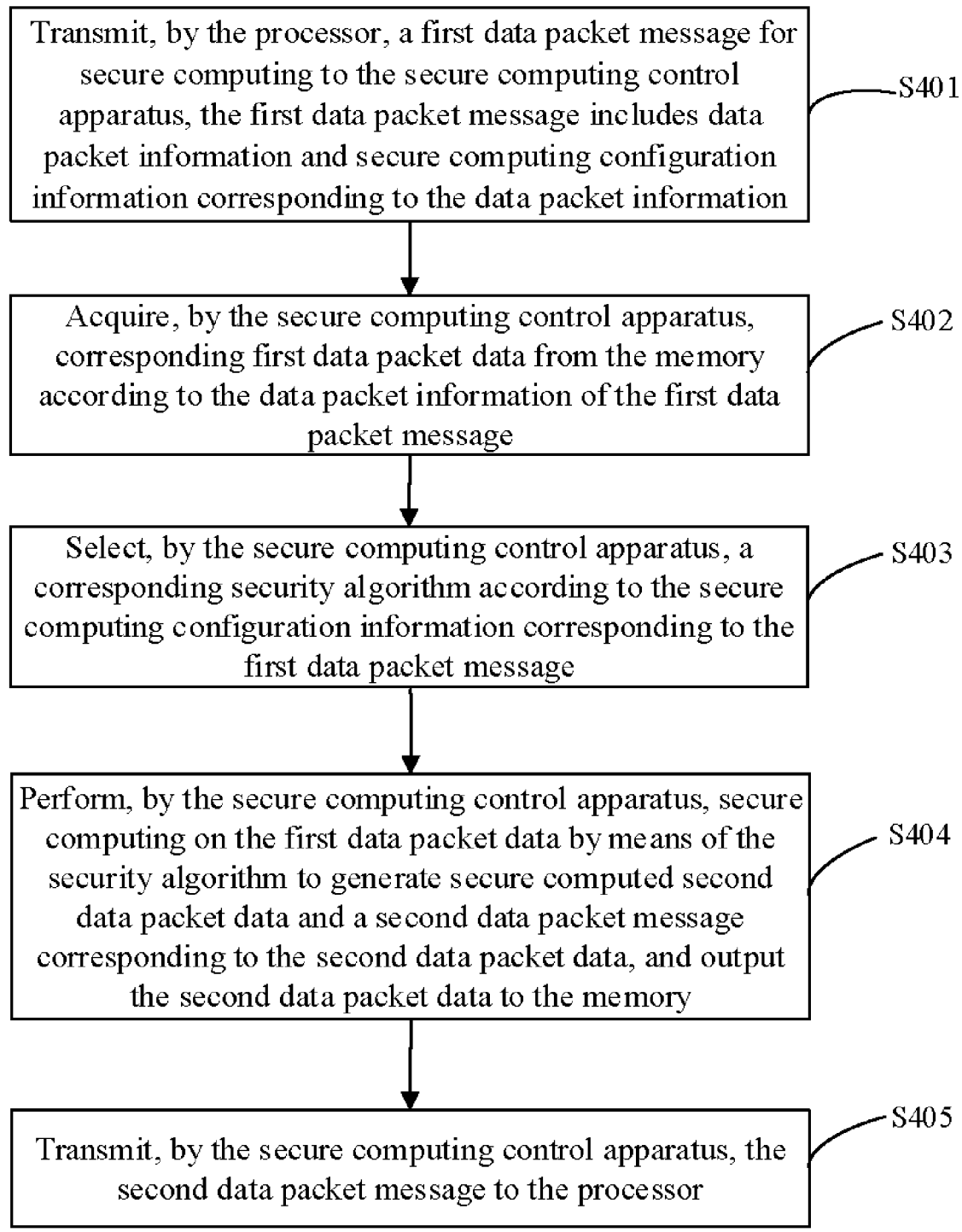
FIG. 4 depicts an overall flowchart of a data packet processing method according to an embodiment of the present disclosure.

FIG. 4 depicts an overall flowchart of a data packet processing method according to an embodiment of the present disclosure, which may be applied to the data packet processing system shown in FIG. 2. The system includes: a processor 101, a memory 102 and a secure computing control apparatus 104 that is connected to the processor 101 and the memory 102, respectively. As shown in FIG. 4, the method includes, but is not limited to, the following S401 to S405.

At S401, the processor 101 transmits a first data packet message for secure computing to the secure computing control apparatus 104, where the first data packet message includes data packet information and secure computing configuration information corresponding to the data packet information.

At S402, the secure computing control apparatus 104 acquires corresponding first data packet data from the memory 102 according to the data packet information of the first data packet message.

At S403, the secure computing control apparatus 104 selects a corresponding algorithm core 103 (i.e., security algorithm) according to the secure computing configuration information corresponding to the first data packet message.

At S404, the secure computing control apparatus 104 performs secure computing on the first data packet data through the algorithm core 103 to generate secure computed second data packet data and a second data packet message corresponding to the second data packet data, and outputs the second data packet data to the memory 102.

At S405, the secure computing control apparatus 104 transmits the second data packet message to the processor 101.

In some implementations, the data packet processing method in the embodiment is applied to the whole data packet processing system shown in FIG. 2, so as to efficiently process data packets by the cooperation of software and hardware.

Figure 5:
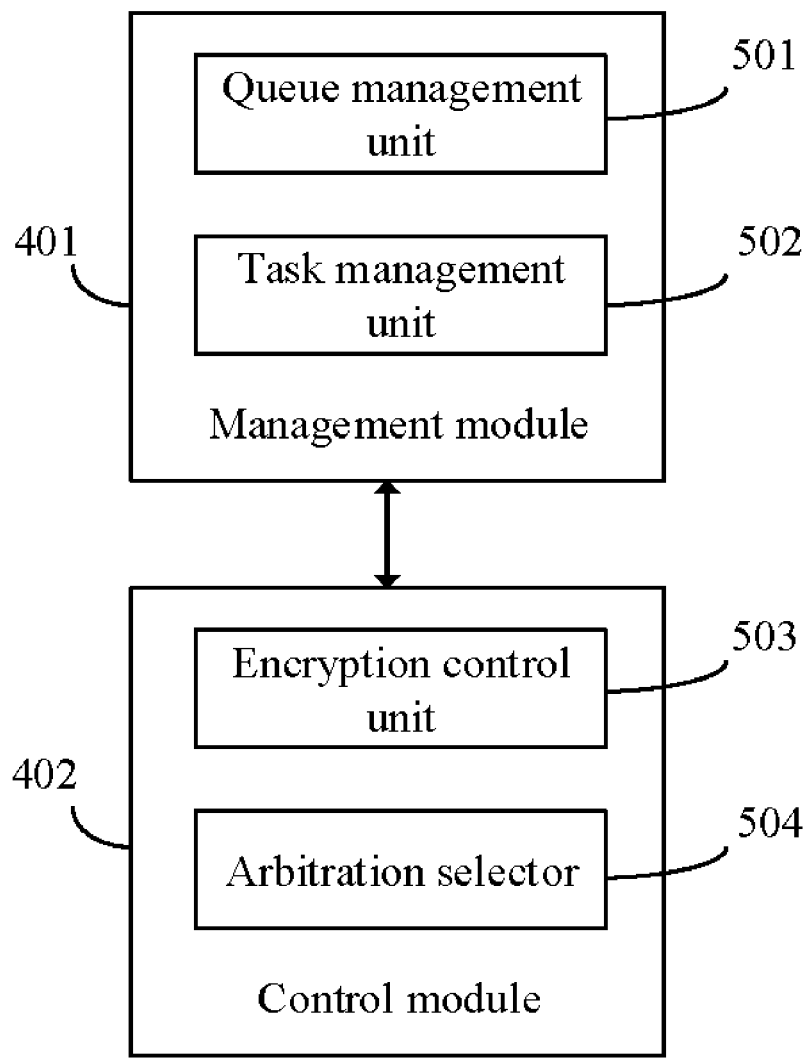
FIG. 5 depicts a schematic diagram showing modules of a secure computing control apparatus according to an embodiment of the present disclosure.

FIG. 5 depicts a schematic diagram showing modules of a secure computing control apparatus 104 according to an embodiment of the present disclosure. As shown in FIG. 5, the secure computing control apparatus 104 includes a management module 401 and a control module 402.

The management module 401 is configured to: receive a first data packet message for secure computing from a processor 101, the first data packet message including data packet information and secure computing configuration information corresponding to the data packet information; and transmit a second data packet message to the processor 101.

The control module 402 is connected to the management module 401 and is configured to: acquire corresponding first data packet data from a memory 102 according to the data packet information of the first data packet message; select a corresponding security algorithm according to the secure computing configuration information corresponding to the first data packet message; perform secure computing on the first data packet data through the security algorithm to generate secure computed second data packet data and a second data packet message corresponding to the second data packet data; and transmit the second data packet data to the memory 102.

In some implementations, the management module 401 includes a queue management unit 501 and a task management unit 502.

The queue management unit 501 includes an input queue, where one or more first data packet messages are formed into a message input queue; and an output queue, where the second data packet messages corresponding to the one or more first data packet messages are formed into a message output queue to be transmitted to the processor 101.

The task management unit 502 is connected to the queue management unit 501 and is configured to: perform order-preserving processing on each data packet message in an order of first data packet messages in the input queue, allocate the first data packet messages in the input queue to one or more encryption engines of the control module 402 for secure computing processing, and transmit the second packet messages to the output queue of the queue management unit 501.

The control module 402 includes an encryption control unit 503 and an arbitration selector 504.

The encryption control unit 503 includes one or more encryption engines. The encryption engines are configured to select and call one or more corresponding security algorithms according to the secure computing configuration information of the first data packet message and perform secure computing on the first data packet data according to the security algorithm corresponding to each piece of first data packet data. In some implementations, the one or more corresponding security algorithms are read from the memory 102.

The arbitration selector 504 is connected to the encryption control unit 503 and configured to establish, according to the allocated first data packet message, routing links between the one or more encryption engines of the encryption control unit and the one or more selected security algorithms.

The secure computing control apparatus 104 in this embodiment may be applied to the data packet processing system shown in FIG. 2. It should be understood by those having ordinary skill in the art that the secure computing control apparatus 104 may also be applied to other hardware environments or software-hardware environments that require secure computing, so as to efficiently control the secure computing of data packets.

Figure 6:
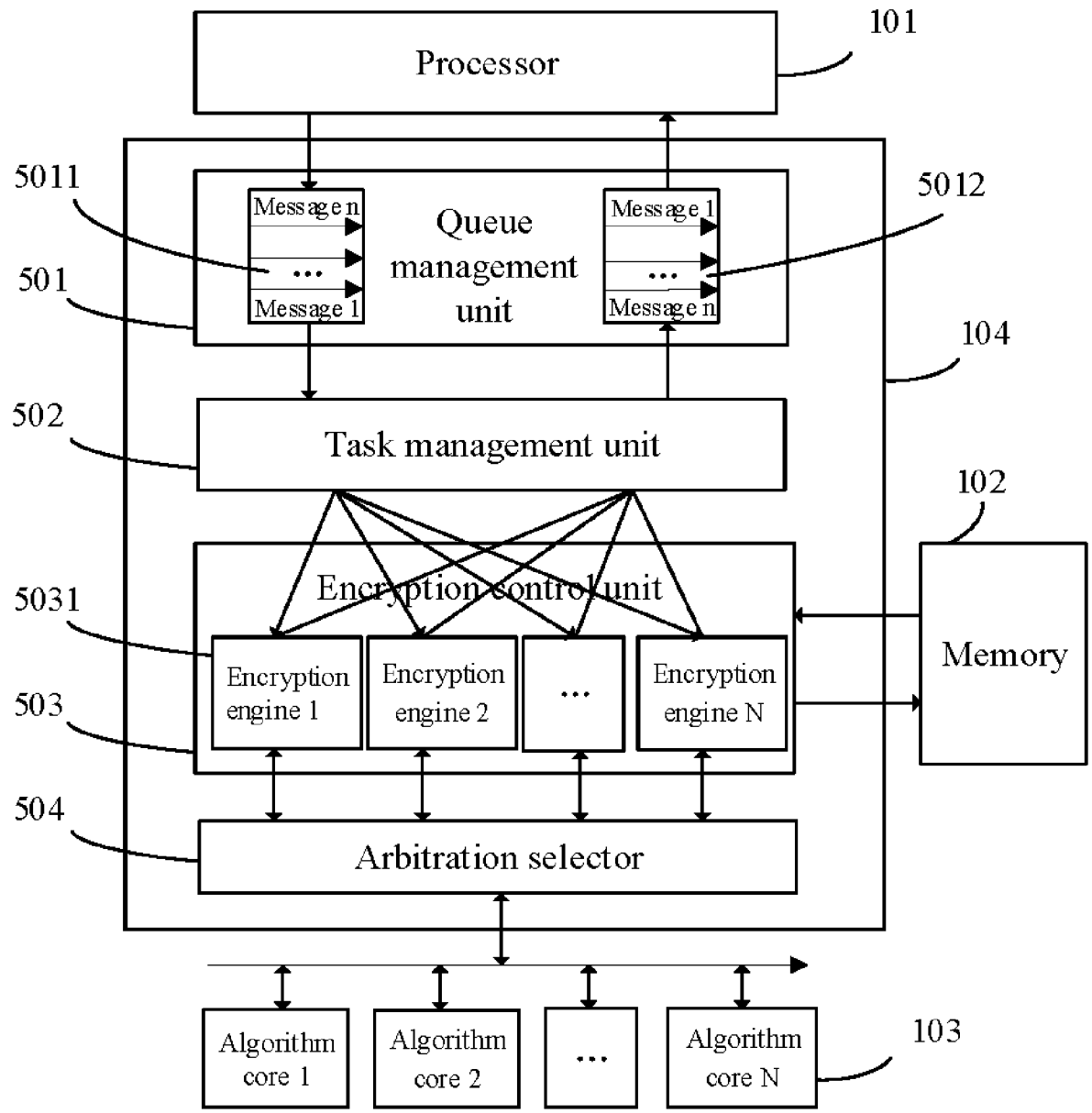
FIG. 6 depicts a schematic diagram showing an architecture of a secure computing control apparatus according to an embodiment of the present disclosure.

FIG. 6 depicts a schematic diagram of internal construction of the secure computing control apparatus 104 according to an embodiment of the present disclosure, with more details. As shown in FIG. 6, the secure computing control apparatus includes a queue management unit 501, a task management unit 502, an encryption control unit 503 and an arbitration selector 504.

The queue management unit 501 includes an input queue 5011 and an output queue 5012. The input queue 5011 includes one or more first data packet messages for secure computing received from a memory 101, each first data packet message includes data packet information and secure computing configuration information corresponding to the data packet information.

The output queue 5012 includes secure computed second data packet messages, and is configured to transmit the second data packet messages to the processor 101.

The task management unit 502 is connected to the queue management unit 501 and is configured to: perform order-preserving processing on the one or more received first data packet messages, allocate the order-preserved one or more first data packet messages to encryption engines 5031 of the encryption control unit 503 for secure computing, and transmit the second data packet messages to the queue management unit 501.

The encryption control unit 503 is connected to the task management unit 502. The encryption control unit 503 includes one or more encryption engines 5031. Each encryption engine 5031 is configured to: read corresponding first data packet data from the memory 102 according to the data packet information of the allocated first data packet messages, select and read one or more corresponding security algorithms from the memory 102 according to the secure computing configuration information of the allocated first data packet messages, perform secure computing on the allocated first data packet data through the one or more selected security algorithms to generate secure computed second data packet and second data packet messages corresponding to the second data packet data, and transmit the second data packet messages to the memory 102.

The arbitration selector 504 is connected to the encryption control unit 503 and configured to establish, according to the allocated first data packet messages, routing links between the one or more encryption engines 5031 of the encryption control unit 503 and the one or more selected security algorithms.

In some implementations, the secure computing control apparatus 104 may be implemented as an application specific integrated circuit (ASIC), a programmable logic device, a system on chip (SOC), etc., into which the hardware control logic may be fixedly written or programmed.

In some implementations, the queue management unit 501 is configured to interact with the processor 101. It can be appreciated that, the queue management unit 501 is interacting with the software via the processor 101. The input queue 5011 stores task information of data packet to be processed, i.e., the one or more first data packet messages. A determination is performed according to the state of the queue as to whether there is a task to be processed. In case that the input queue 5011 is in a non-null state, one or more first data packet messages are extracted from the input queue 5011 and transmitted to the task management unit 502. In some implementations, the output queue 5012 stores the information of secure computed data packet tasks, i.e., the second data packet messages. Once the secure computing is completed, the second data packet messages are transmitted to the output queue 5012 by the task management unit 502 for subsequent processing(s).

In some implementations, the task management unit 502 is configured to perform order-preserving processing and scheduling. During the order-preserving processing, as an example, an order-preserving tag is added to each first data packet message, so that the first data packet message may be output with order-preserved once secure computing is completed. Based on the similarities between the security algorithm and the protocol, the apparatus or the whole system including the apparatus may support the order-preserving processing. Once the order-preserving tag is added, as an example, each first data packet message may be allocated to an idle encryption engine 5031 (for example, this encryption engine has completed the previous secure computing task and thus is in an idle state) according to the order of this first data packet message in the input queue. Since there may be a plurality of encryption engines 5031 and the encryption engines to be in the idle state for secure computing is out-of-order of the first data packet messages, once the data packets corresponding to a plurality of first data packet messages have been successively subjected to secure computing by the plurality of encryption engines 5031, the order of each first data packet message in the input queue may be reproduced by means of the order-preserving tag, and each first data packet message is output to the output queue, so that the processor calls and processes data packets sequentially. During scheduling, as an example, if the encryption control unit 503 is provided with M sets of encryption engines 5031, the task management unit 502 makes a request to the encryption control unit 503 for an idle encryption engine 5031. When there are one or more idle encryption engines 503, for example, when the one or more encryption engines 5031 have completed the previously allocated secure computing, the task management unit 502 allocates the data packet secure computing tasks to be processed (i.e., one or more first data packet messages) in the output queue 5012 to the one or more encryption engines 5031, thereby realizing scheduling. Through scheduling, the secure computing spatial resources such as the encryption engines 5031 are fully utilized, so that multiple sets of encryption engines 5031 may process in parallel, the processing efficiency of data packets is improved, and the expansibility of the apparatus or the whole system including the apparatus is improved.

In some implementations, the encryption control unit 503 is configured to complete the control of secure computing of data packets, such as encryption, decryption, authentication and additional authentication as well as data processing. As shown in FIGS. 4-5, the encryption control unit 503 may include M sets of encryption engines 5031 for processing a plurality of data packets in parallel. Each set of encryption engines 5031 controls and completes the operation of multi-stage or single-stage secure computing.

Figure 7:
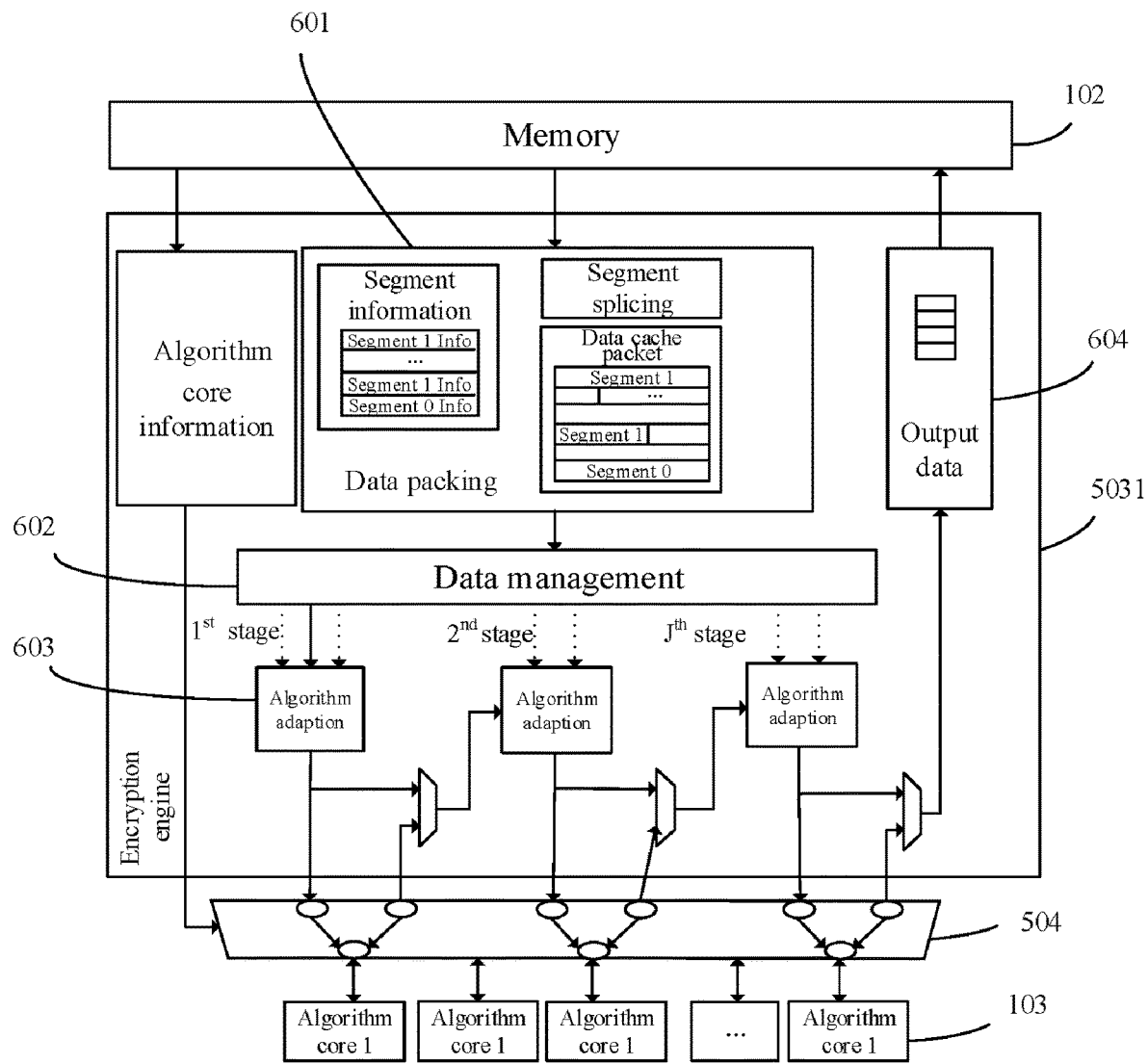
FIG. 7 depicts a schematic diagram showing construction of encryption engines according to an embodiment of the present disclosure.

FIG. 7 depicts a schematic diagram showing construction of encryption engine 5031 according to an embodiment of the present disclosure. As shown in FIG. 7, the encryption engine 5031 of the encryption control unit 503 corresponds to one of the secure computing spatial resources in the method as described above. The encryption engine 5031 may include a data packing sub-unit 601, a data packet management sub-unit 602, a plurality of algorithm adaption sub-units 603 and an output sub-unit 604.

The data packing sub-unit 601 is configured to acquire segment data of the corresponding data packet from the memory 102 according to the segment information of the data packet and splice the segment data to generate data packet cache data.

The data packet management sub-unit 602 is connected to the data packing sub-unit 601 and is configured to match the data packet cache data with appropriate security algorithms and transmit the data packet cache data to the algorithm adaption sub-units 603 according to a result of matching.

The plurality of algorithm adaption sub-units 603 are connected to the data management sub-unit 602 and are connected in stages. Each stage of algorithm adaption sub-unit 603 is configured to route, according to the selected security algorithm and the first data packet message, the data packet cache data to an appropriate security algorithm for multi-stage operation or single-stage operation, and a last algorithm adaption sub-unit (e.g., a $J^{th}$-stage algorithm adaption sub-unit 603 in FIG. 7) transmits the secure computed second data packet data to the output sub-unit 604. Herein, the security algorithm may also be called an algorithm core 103.

The output sub-unit 604 is connected to the last-stage algorithm adaption sub-unit 603 and is configured to transmit the secure computed second data packet data to the memory 102.

In particular, the data packet information of the first data packet message includes segment information of the data packet, and the first data packet data includes segment data corresponding to the segment information.

In some implements, the time of data accessing from the memory is saved by two parallel paths. As shown at the moment T2 in the flowchart of the parallel operation of the encryption engines 5031 in FIG. 8, once the encryption engine 5031 starts reading the algorithm core 103 from the memory 102, the data packing sub-unit 601 may cooperatively read the segment data from the memory 102 in parallel, thereby realizing parallel processing. The data packing sub-unit 601 also reads the segment data from the memory 102 in a pipelined manner, then splices the segment data by splicing, and finally transmits the spliced data packet cache data to each stage of algorithm adaption sub-unit 603 through the data management sub-unit 602, thereby realizing the centralized processing of data.

Figure 8:
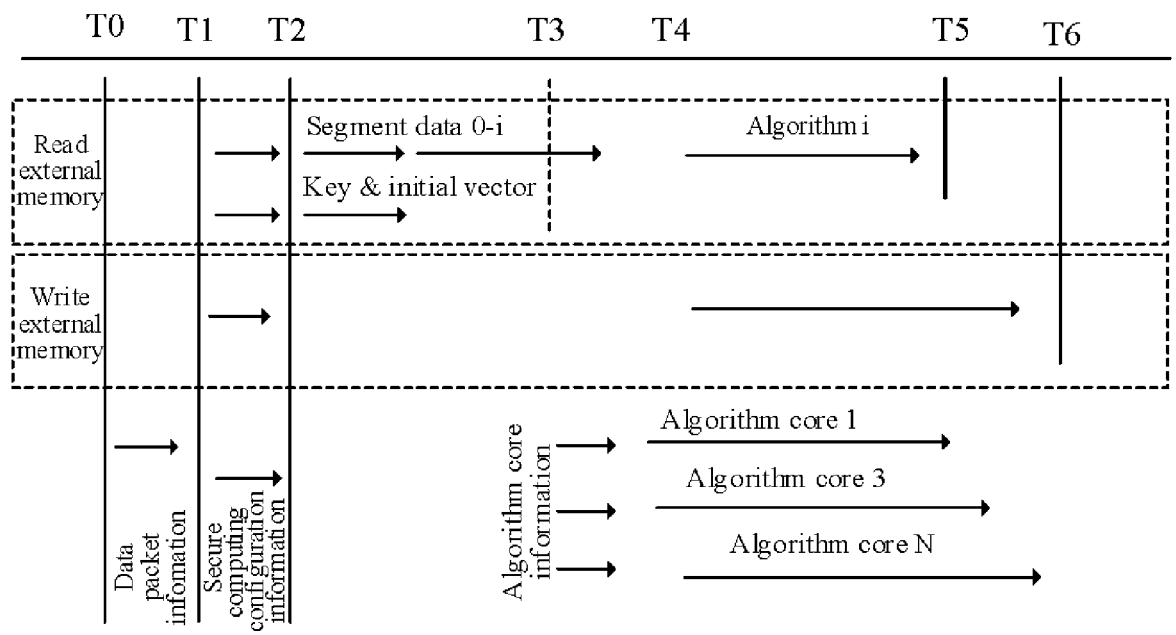
FIG. 8 depicts a flowchart showing parallel operations of the encryption engines according to an embodiment of the present disclosure.

As shown in the period of time T2-T5 in FIG. 8, when packing the spliced segment data, the data packing sub-unit 601 successively allocates the packed data packet cache data to the algorithm adaption sub-units 603 through the data management sub-unit 602. By the cooperation of several technical means such as parallel processing, data splicing and centralized data management, the processing time of data packets is effectively reduced.

In some embodiments, the algorithm adaption sub-units 603 allocate the data packet cache data to the corresponding algorithm cores 103 for secure computing, and transmit the secure computed second data packet data to the output sub-unit 604. For the secure computing with multiple algorithm algorithms, pipelined operations may be performed on the data packet cache data between the algorithm adaption sub-units 603.

As shown at the moment T4 in FIG. 8, when both the algorithm cores 103 are and the data packet cache data are ready, the algorithm cores 103 may be activated for secure computing. The data packet cache data immediately flows in the algorithm adaption sub-units 603. The data that can be shared by the algorithm cores 103 of the algorithm adaption sub-units 603 is cached to a next stage by pipelining. Different data that is to be separately processed by the algorithm adaption sub-units 603 may be separately transmitted to the algorithm adaption sub-units 603 for separation processing through the data management sub-unit 602.

As an example, as long as each algorithm adaption sub-unit 603 is stored with data and a next-stage algorithm adaption sub-unit 603 is ready, the data may be outputted for next-stage processing. There may be the following three situations.

Single-stage processing: the data is transmitted to the algorithm core 103 allocated to a single algorithm adaption sub-unit 603. For example, it is only necessary to encrypt the data.

Stage-by-stage processing in multi-stage processing: the data is transmitted to the algorithm core 103 allocated to a first-stage algorithm adaption sub-unit 603 for processing, and then is transmitted to a next stage after being processed, so that data caching to a next stage is realized stage by stage. For example, at the first stage, encryption is performed by calling an encryption algorithm; and, at the second stage, authentication is performed by calling an authentication algorithm.

Non-stage-by-stage processing in multi-stage processing: the data is directly forwarded to a next-stage algorithm adaption unit instead of being transmitted to the algorithm core 103 allocated to the current-stage algorithm adaption sub-unit 603, for example, when the current-stage algorithm adaption sub-unit 602 is not required in the secure computing.

Thus, by operating the algorithm cores 103 in parallel, the utilization rate of data is greatly improved. Meanwhile, the output data, if presents the last-stage algorithm adaption sub-unit 603, is transmitted to the output sub-unit 604 for processing, so that the secure computed second data packet data is written into the memory 102 in a pipelined manner. Thus, the data input process and the data output process are also parallel operations, as shown in the period of time T4-T6 in FIG. 8.

By means of the encryption engine 5031 in the present disclosure, the processing time is effectively saved, and the computing performance of multiple stages of security algorithms is greatly improved as compared with separate reading of the data packet cache data by each algorithm adaption sub-unit. Meanwhile, the keys, context and other related configuration information as required by the algorithm cores 103 are processed in parallel with the data packet data, so that the time is saved in comparison to the serial processing method.

In some implementations, the arbitration selector 504 completes the arbitration and routing links between the encryption control unit 503 and the algorithm cores 103. The arbitration selector 504 establishes a routing relationship between the encryption control unit 503 and the algorithm cores 103, and completes the arbitration of the algorithm cores 103. By means of the data packet information and secure computing configuration information of the first data packet message, particularly the information of the processing order of security algorithms in the secure computing configuration information, the routing relationship between M sets of encryption engines 5031 and N algorithm cores 103 is established. Since the algorithm cores 103 are equivalent to a resource pool and the M sets of encryption engines 5031 actually share the N algorithm cores 103, when one algorithm core 103 is requested and called by multiple encryption engines 5031 simultaneously, the algorithm cores 103 is utilized by arbitration. For example, once each algorithm adaption sub-unit 603 in the current encryption engine 5031 has completed processing, the algorithm core 103 may be released for other encryption engines 5031 or subsequent processing(s). In the secure computing process of the algorithm core 103, the arbitration selector 504 may also forward the data packet cache data to a next-stage algorithm adaption sub-unit 603 for processing.

With reference to FIG. 2 again, the secure computing control apparatus 104 in the embodiment may be applied to the data packet processing system shown in FIG. 2. The data packet processing system may include: a processor 101; a memory 102; and, a secure computing control apparatus 104, which is connected to the processor 101 and the memory 102, respectively.

In some implementations, merely light tasks are to be processed with the processor 101 in the data packet processing system. In such a case, the processor 101 may encapsulate the first data packet message according to the data format of the hardware, and the first data packet message is subsequently parsed by the encryption engine 5031 for the content of the message. The data packet to be processed with secure computing may support a plurality of data segments, and it is unnecessary for the processor 101 to form a complete data packet from the segments and then transmit the data packet to the hardware, for example, the secure computing control apparatus 104 as described in this embodiment for processing, instead, the packing task is transferred to the hardware, so that the performance of the whole system is improved.

The processor 101 transmits the encapsulated data packet information to the secure computing control apparatus 104, in particular, the data packet information is transmitted to the input queue 5011 of the queue management unit 501 of the secure computing control apparatus 104 as shown in FIG. 6. The simple and efficient interaction between software and hardware is realized by queuing.

FIG. 9 shows a flowchart of an example application scenario of the data packet processing system according to an embodiment of the present disclosure.

The construction of the secure computing system for data packets is as described above. The flowchart includes S801 to S817.

At S801, the processor 101 encapsulates first data packet messages.

At S802, the processor 101 transmits the first data packet messages to the input queue 5011 of the secure computing control apparatus 104.

At S803, the secure computing control apparatus 104 determines if first data packet messages (i.e., data packet secure computing tasks) are presented in the input queue 5011.

At S804, if the result of determination at the S803 is TRUE, the secure computing control apparatus 104 extracts one or more first data packet messages from the input queue 5011, where the first data packet message includes data packet information and secure computing configuration information corresponding to the data packet information.

At S805, the secure computing control apparatus 104 performs order-preserving processing on the one or more extracted first data packet messages and transmit the one or more first data packet messages to an idle encryption engine 5031.

At S806, the encryption engine 5031 parses the encapsulated first data packet messages.

At S807, the encryption engine 5031 configure the data packet information and secure computing configuration information of the parsed first data packet messages to each sub-unit.

At S808, the encryption engine 5031 reads the information of one or more algorithm cores 103 from the memory 102.

At S809, the encryption engine 5031 establishes routing links between one or more algorithm cores 103 and one or more algorithm adaption sub-units 603 according to the parsed data packet information and secure computing configuration information through the arbitration selector 504.

At S810, parallel to S809, the encryption engine 5031 reads segment data from the memory 102 in a pipelined manner, and packs data via the packing sub-unit.

At S811, a determination is performed as to whether the algorithm cores 103 are ready and whether data packet cache data is cached in the encryption engine 5031.

At S812, if the result of determination at S811 is TRUE, the data packet cache data is transmitted between the algorithm adaption sub-units 603 to the corresponding algorithm cores 103 for secure computing at multiple stages or a single stage.

At S813, a determination is performed as to whether the secure computed second data packet data is cached in the last-stage algorithm adaption sub-unit 603.

At S814, if the result of determination at S813 is TRUE, the second data packet data is written into the memory 102 in a pipelined manner.

At S815, a determination is made as to whether the second data packet data is entirely written into the memory 102.

At S816, if the result of determination at S815 is TRUE, the secure computing control apparatus 104 performs order-preserving processing on second data packet messages corresponding to the second data packet data, and transmits the second data packet messages to the output queue 5012.

At S817, the secure computing control apparatus 104 interacts with the processor 101 via the output queue 5012, and transmits the second data packet messages to the processor 101.

In applications, when the Internet protocol security (IPSEC) protocol on the network side processes a data packet, an encapsulating security payload (ESP) encryption algorithm, an ESP authentication algorithm and an authentication header (AH) authentication algorithm may be utilized. In this case, secure computing is to be performed by at most three algorithm cores 103. When the PDCP protocol on the radio side processes a data packet, ZUC f9 authentication algorithm and ZUC F8 encryption algorithm may be utilized. In this case, secure computing is to be performed by at most two algorithm cores 103. The secure computing control apparatus 104 and the data packet processing system according to the embodiments of the present disclosure are suitable for the efficient utilization of multiple stages of security algorithms, the improvement of the processing efficiency of data packets in coordination with the algorithm cores 103 and the improvement of the efficiency of security algorithms for multi-stage processing are achieved.

In the radio access system of the base station, in terms of the application of the secure processing of the Internet protocol (IP) layer on the network side and the packet data convergence protocol (PDCP) layer on the radio side, during secure computing, the secure computing control apparatus 104 and the data packet processing system according to various embodiments of the present disclosure realize efficient processing of data packet and reduce the processing time of data packets through task scheduling management, data packet centralized processing, resource sharing or other methods by the cooperation of various technologies such as data splicing, parallel computation and multi-stage security algorithms sharing storage and processing.

In addition, in accordance with an embodiment of the present disclosure, a non-transitory computer-readable storage medium is further provided. The non-transitory computer-readable storage medium stores computer programs which, when executed by a processor, cause the processor to implement the secure computing control method described above or the data packet processing method described above.

The method in an embodiment of the present disclosure includes: acquiring a first data packet message from a processor; acquiring corresponding first data packet data from a memory; selecting a corresponding security algorithm and packing the first data packet data and performing secure computing to generate secure computed second data packet data and a corresponding second data packet message. Based on the technical schemes in the embodiments of the present disclosure, some processes or environments of data packet processing that are to be executed by software via the processor are released to the hardware for completion, and the interaction between the software and the hardware is accelerated by queues on the hardware. The load of the software is released by data packet segmentation, so that the performance of the whole secure computing system is improved. The data packets are centralized for processing by pipelining and splicing, so that the efficiency of accessing the external storage is improved. Moreover, through the pipelined parallel processing of the algorithm adaption units, particularly the secure computing of multi-stage algorithms, the processing time of data packets is greatly reduced. To sum up, in accordance with the embodiments of the present disclosure, the processing time of data packets can be saved, the processing efficiency of the system can be improved, and the overall secure computing performance can be improved. The embodiments of the present disclosure have good processing performance, flexibility and expansibility, and can satisfy the computing scenarios of different protocols and different security algorithms.

The apparatus embodiments described above are only illustrative. The units described as separate components may be or may not be physically separated from each other, that is, they may be located in one place or may be distributed on a plurality of network units. Some or all of the modules may be selected according to practical needs to achieve the objectives of the schemes of the embodiments.

It should be understood by those having ordinary skill in the art that all or some of the steps in the methods disclosed above and the systems disclosed above may be implemented as software, firmware, hardware and suitable combinations thereof. Some or all of the physical components may be implemented as software executed by processors such as central processors, digital signal processors or microprocessors, or implemented as hardware, or implemented as integrated circuits such as application specific integrated circuits. Such software may be distributed on a computer-readable medium, and the computer-readable medium may include computer storage mediums (or non-transitory mediums) and communication mediums (or transitory mediums). As well-known to those having ordinary skill in the art, the term computer storage medium includes volatile or non-volatile and removable or non-removable mediums implemented in any method or technology used to store information (such as computer-readable instructions, data structures, program modules or other data). The computer storage medium may include, but not limited to, RAMs, ROMs, EEPROMs, flash memories and other memory technologies, CD-RMs, digital versatile disks (DVDs) or other optical disk storages, magnetic cassettes, magnetic tapes, magnetic disk storages or other magnetic storage devices, or any other mediums that can be used to store desired information and can be accessed by computers. In addition, as well-known to those having ordinary skill in the art, the communication medium generally includes computer-readable instructions, data structures, program modules or other data in modulation data signals such as carriers or other transmission mechanisms, and may include any information transfer medium.

Although some implementations of the present disclosure have been described above in detail, the present disclosure is not limited thereto. Those having ordinary skill in the art can make various equivalent variations or alternations without departing from the protection scope of the present disclosure, and these equivalent variations or alternations shall fall within the protection scope defined by the appended claims of the present disclosure.

The invention claimed is:

1. A secure computing control method, comprising:
receiving a first data packet message for secure computing from a processor, the first data packet message comprising data packet information and secure computing configuration information corresponding to the data packet information;
acquiring corresponding first data packet data from a memory according to the data packet information of the first data packet message;
selecting a corresponding security algorithm according to the secure computing configuration information corresponding to the first data packet message;
performing secure computing on the first data packet data by means of the selected security algorithm to generate secure computed second data packet data and a second data packet message corresponding to the second data packet data;
transmitting the second data packet data to the memory; and
transmitting the second data packet message to the processor;
wherein, the second data packet message comprises information about a data packet on which secure computing has been performed and secure computing processing information corresponding to the information about the data packet;
wherein, the performing of secure computing on the first data packet data by means of the selected security algorithm comprises:
performing secure computing on each piece of the first data packet data respectively, based on the message input queue according to the security algorithm corresponding to a respective one piece of first data packet data, which in turn comprises:

allocating at least one idle secure computing spatial resource for secure computing in an order of the first data packet message in the input queue; and performing secure computing on each piece of the first data packet data respectively, according to the security algorithm corresponding to a respective one piece of first data packet data.

2. The secure computing control method of claim 1, wherein the receiving of the first data packet message for secure computing from a processor comprises:

receiving at least one first data packet message for secure computing from the processor, and the at least one first data packet message forms a message input queue; and the transmitting of the second data packet message to the processor comprises:

acquiring at least one second data packet message each corresponding to a respective one of the at least one first data packet message, forming the second data packet message into a message output queue, and transmitting the message output queue to the processor.

3. The secure computing control method of claim 1, wherein the data packet information of the first data packet message comprises segment information of a data packet, the first data packet data comprises segment data corresponding to the segment information, and the acquiring of corresponding first data packet data from the memory according to the data packet information of the first data packet message comprises:

acquiring segment data of the corresponding data packet from the memory according to the segment information of the data packet, and splicing the segment data to generate data packet cache data.

4. The secure computing control method of claim 3, wherein the secure computing configuration information of the first data packet message comprises information of security algorithm to be selected, information of an order of processing by security algorithm, and security algorithm configuration information;

the selecting of the corresponding security algorithm according to the secure computing configuration information corresponding to the first data packet message comprises:

selecting and acquiring at least one corresponding security algorithm from the memory according to the secure computing configuration information corresponding to the first data packet message; and the performing of secure computing on the first data packet data by means of the selected security algorithm comprises:

in response to one security algorithm being selected, performing single-stage secure computing, according to the secure computing configuration information, on the data packet cache data by means of the selected security algorithm, or in response to a plurality of security algorithms being selected, performing multi-stage secure computing, according to the secure computing configuration information and in the processing order of security algorithms, on the data packet cache data by means of the plurality of security algorithms.

5. The secure computing control method of claim 1, wherein the selecting the corresponding security algorithm according to the secure computing configuration information corresponding to the first data packet message comprises:

selecting at least one corresponding security algorithm from the memory according to the secure computing configuration information corresponding to the first data packet message, and allocating each of the at least one security algorithm to a respective one of the at least one secure computing spatial resource.

6. A secure computing control apparatus, comprising:

a storage device, a processing unit and at least one computer program stored on the storage device and executable by the processing unit which, when executed by the processing unit, causes the processing unit to perform a secure computing control method comprising, receiving a first data packet message for secure computing from a processor, the first data packet message comprising data packet information and secure computing configuration information corresponding to the data packet information;

acquiring corresponding first data packet data from a memory according to the data packet information of the first data packet message;

selecting a corresponding security algorithm according to the secure computing configuration information corresponding to the first data packet message;

performing secure computing on the first data packet data by means of the selected security algorithm to generate secure computed second data packet data and a second data packet message corresponding to the second data packet data;

transmitting the second data packet data to the memory; and transmitting the second data packet message to the processor;

wherein, the second data packet message comprises information about a data packet on which secure computing has been performed and secure computing processing information corresponding to the information about the data packet; and wherein, the performing of secure computing on the first data packet data by means of the selected security algorithm comprises:

performing secure computing on each piece of the first data packet data respectively, based on the message input queue according to the security algorithm corresponding to a respective one piece of first data packet data, which in turn comprises:

allocating at least one idle secure computing spatial resource for secure computing in an order of the first data packet message in the input queue; and performing secure computing on each piece of the first data packet data respectively, according to the security algorithm corresponding to a respective one piece of first data packet data.

7. The secure computing control apparatus of claim 6, wherein the receiving of the first data packet message for secure computing from a processor comprises:

receiving at least one first data packet message for secure computing from the processor, and the at least one first data packet message forms a message input queue;

the transmitting of the second data packet message to the processor comprises:

acquiring at least one second data packet message each corresponding to a respective one of the at least one first data packet message, forming the second data packet message into a message output queue, and transmitting the message output queue to the processor.

8. The secure computing control apparatus of claim 6, wherein the data packet information of the first data packet message comprises segment information of a data packet, the first data packet data comprises segment data corresponding to the segment information, and the acquiring of corresponding first data packet data from the memory according to the data packet information of the first data packet message comprises:
  acquiring segment data of the corresponding data packet from the memory according to the segment information of the data packet, and
  splicing the segment data to generate data packet cache data.

9. The secure computing control apparatus of claim 8, wherein the secure computing configuration information of the first data packet message comprises information of security algorithm to be selected, information of an order of processing by security algorithm, and security algorithm configuration information;
  the selecting of the corresponding security algorithm according to the secure computing configuration information corresponding to the first data packet message comprises:
    selecting and acquiring at least one corresponding security algorithm from the memory according to the secure computing configuration information corresponding to the first data packet message; and
  the performing of secure computing on the first data packet data by means of the selected security algorithm comprises:
    in response to one security algorithm being selected, performing single-stage secure computing, according to the secure computing configuration information, on the data packet cache data by means of the selected security algorithm, or
    in response to a plurality of security algorithms being selected, performing multi-stage secure computing, according to the secure computing configuration information and in the processing order of security algorithms, on the data packet cache data by means of the plurality of security algorithms.

10. The secure computing control apparatus of claim 6, wherein the selecting the corresponding security algorithm according to the secure computing configuration information corresponding to the first data packet message comprises:
  selecting at least one corresponding security algorithm from the memory according to the secure computing configuration information corresponding to the first data packet message, and
  allocating each of the at least one security algorithm to a respective one of the at least one secure computing spatial resource.

11. A non-transitory computer-readable storage medium, storing at least one computer program which, when executed by a processor, causes the processor to perform a secure computing control method comprising,
  receiving a first data packet message for secure computing from a processor, the first data packet message comprising data packet information and secure computing configuration information corresponding to the data packet information;
  acquiring corresponding first data packet data from a memory according to the data packet information of the first data packet message;
  selecting a corresponding security algorithm according to the secure computing configuration information corresponding to the first data packet message;
  performing secure computing on the first data packet data by means of the selected security algorithm to generate secure computed second data packet data and a second data packet message corresponding to the second data packet data;
  transmitting the second data packet data to the memory; and
  transmitting the second data packet message to the processor;
  wherein, the second data packet message comprises information about a data packet on which secure computing has been performed and secure computing processing information corresponding to the information about the data packet; and
  wherein, the performing of secure computing on the first data packet data by means of the selected security algorithm comprises:
    performing secure computing on each piece of the first data packet data respectively, based on the message input queue according to the security algorithm corresponding to a respective one piece of first data packet data, which in turn comprises:
      allocating at least one idle secure computing spatial resource for secure computing in an order of the first data packet message in the input queue; and
      performing secure computing on each piece of the first data packet data respectively, according to the security algorithm corresponding to a respective one piece of first data packet data.

12. The non-transitory computer-readable storage medium of claim 11, wherein the receiving of the first data packet message for secure computing from a processor comprises:
  receiving at least one first data packet message for secure computing from the processer, and the at least one first data packet message forms a message input queue;
  the transmitting of the second data packet message to the processor comprises:
    acquiring at least one second data packet message each corresponding to a respective one of the at least one first data packet message, forming the second data packet message into a message output queue, and transmitting the message output queue to the processor.

13. The non-transitory computer-readable storage medium of claim 11, wherein the data packet information of the first data packet message comprises segment information of a data packet, the first data packet data comprises segment data corresponding to the segment information, and the acquiring of corresponding first data packet data from the memory according to the data packet information of the first data packet message comprises:
  acquiring segment data of the corresponding data packet from the memory according to the segment information of the data packet, and
  splicing the segment data to generate data packet cache data.

14. The non-transitory computer-readable storage medium of claim 13, wherein the secure computing configuration information of the first data packet message comprises information of security algorithm to be selected, information of an order of processing by security algorithm, and security algorithm configuration information;

the selecting of the corresponding security algorithm according to the secure computing configuration information corresponding to the first data packet message comprises:

selecting and acquiring at least one corresponding security algorithm from the memory according to the secure computing configuration information corresponding to the first data packet message; and the performing of secure computing on the first data packet data by means of the selected security algorithm comprises:

in response to one security algorithm being selected, performing single-stage secure computing, according to the secure computing configuration information, on the data packet cache data by means of the selected security algorithm, or in response to a plurality of security algorithms being selected, performing multi-stage secure computing, according to the secure computing configuration information and in the processing order of security algorithms, on the data packet cache data by means of the plurality of security algorithms.

15. The non-transitory computer-readable storage medium of claim 11, wherein the selecting the corresponding security algorithm according to the secure computing configuration information corresponding to the first data packet message comprises:

selecting at least one corresponding security algorithm from the memory according to the secure computing configuration information corresponding to the first data packet message, and allocating each of the at least one security algorithm to a respective one of the at least one secure computing spatial resource.

\* \* \* \* \*